Figure 9:
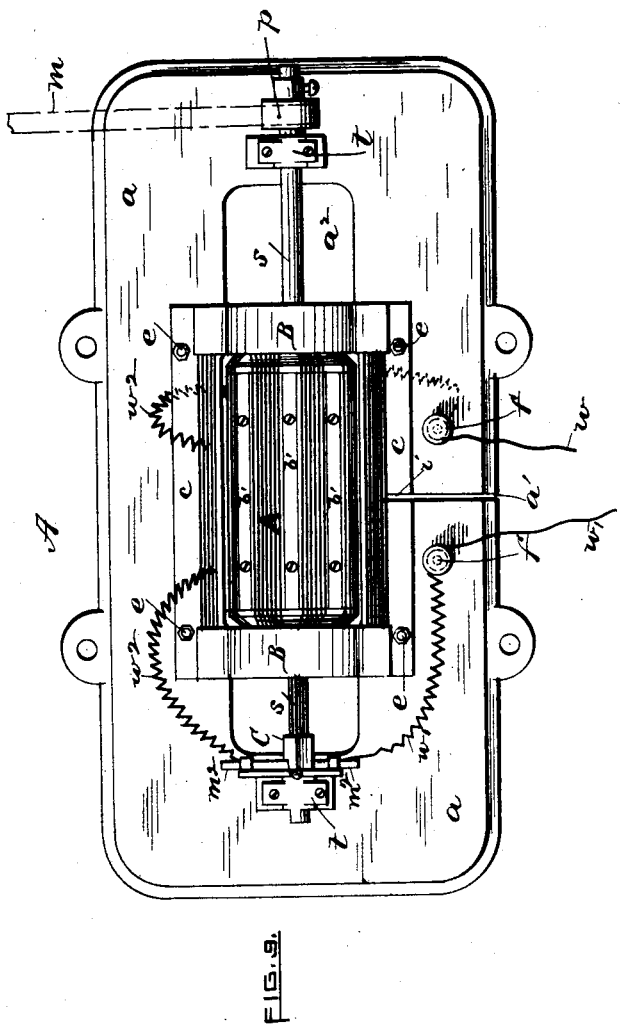

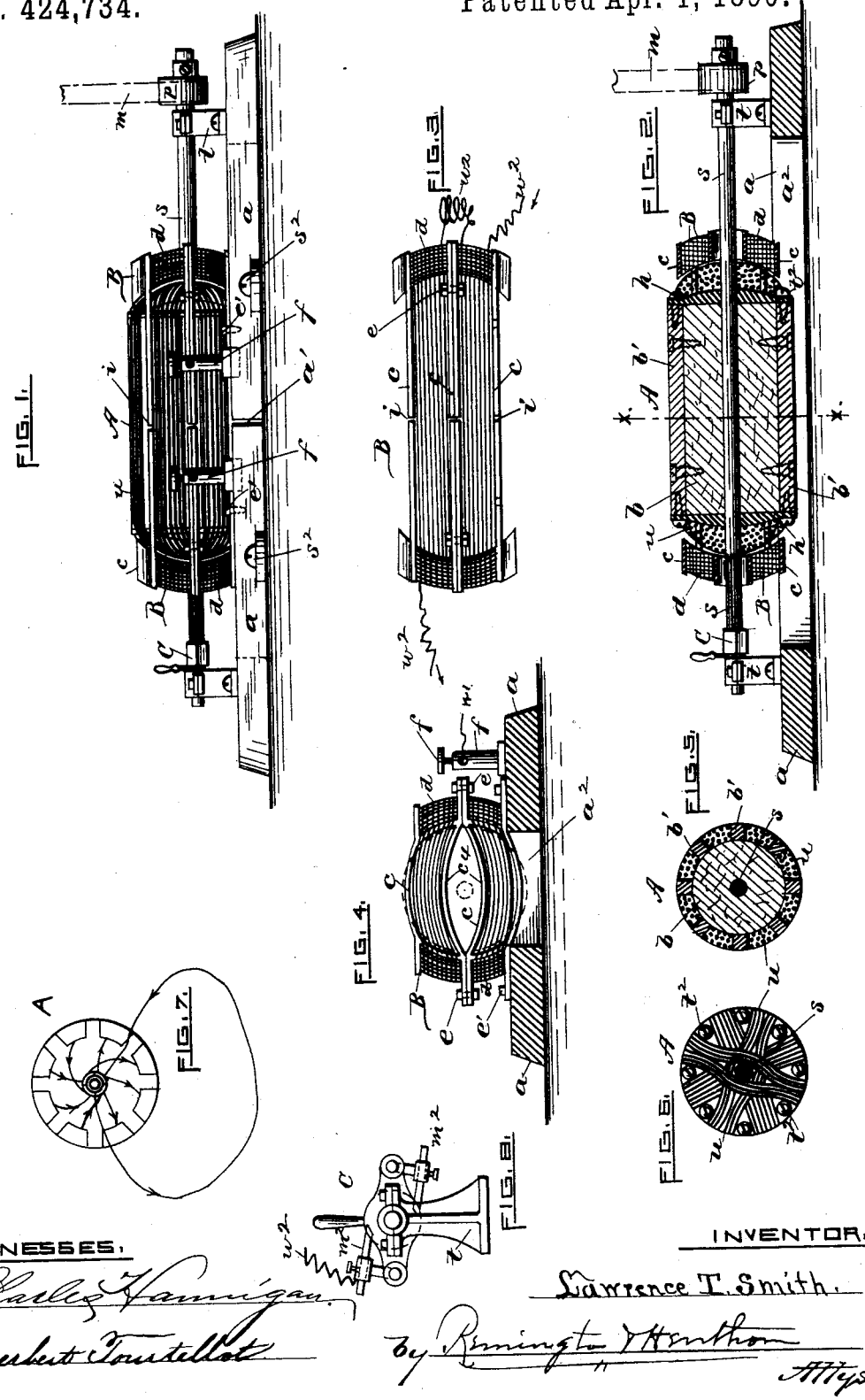

(No Model.) 2 Sheets—Sheet 2.

L. T. SMITH.
ELECTRIC MOTOR.

No. 424,734. Patented Apr. 1, 1890.

WITNESSES. INVENTOR.

UNITED STATES PATENT OFFICE.

LAWRENCE T. SMITH, OF PROVIDENCE, RHODE ISLAND.

ELECTRIC MOTOR.

SPECIFICATION forming part of Letters Patent No. 424,734, dated April 1, 1890.

Application filed December 26, 1888. Serial No. 294,686. (No model.)

*To all whom it may concern:*

Be it known that I, LAWRENCE T. SMITH, a citizen of the United States, residing at Providence, in the county of Providence and State of Rhode Island, have invented certain new and useful Improvements in Electric Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to electric motors, but more especially to motors in which an alternating current of electricity is employed and converted into work.

Usually heretofore all motors of the class referred to have been so constructed and arranged that the field-magnets thereof or armatures, or both, have magnetic matter either by itself, or the magnets or armatures may be wound with an insulated conductor, through which an electric current may be passed. In machines of this character, when used on alternating-current circuits, it is practically found that an intense heat is developed. Such heat is, I believe, caused by induced currents in the undivided or laminated magnetic portion, or it may be due to the rapid change of polarity of the poles, or possibly a combination of the two causes named. The result of such heating is a rapid deterioration of the insulation or covering of the conductors, and as the heating increases rapidly as the size of alternating-current machines increase it follows that it has not been possible, or, at least, practicable, to construct a large motor of this class—that is to say, one of five-horse power—which did not heat to such an extent as to seriously affect its efficiency, it being evident that an excess of heat must necessarily be accompanied by a decrease in the machine's efficiency.

Another objection to machines of the class before referred to, in which magnetic substances or materials are used and which employ a commutator, is the destructive generation of electric sparks at the brushes whenever a change of load takes place. Such change is caused mainly by a shifting of the poles in the armature, or the "lead," as it is called, of the magnetic matter.

The object of my present invention is to produce an alternating-current motor in which the excessive or destructive heating before spoken of is overcome, thereby rendering it possible to construct a motor of any required size and power, which cannot be done when magnetic matter is used in connection with an alternating current.

Another advantage of my invention is the prevention of the generation of sparks at the brushes on a change of load.

My invention consists, essentially, of an alternating-current motor having the field-magnet core, armature, and substantially all the working and electrical parts composed of non-magnetic material or non-conductors of electricity, as wood, vulcanite, &c. I also make the "magnetic field," so called, to consist of a non-magnetic split core (or turns or coils connected so as to act as a single coil) formed of an insulated conductor, through which an electric current is sent, thereby creating an electrical field, the split core on which it is wound thus preventing useless induction and heating, which latter has heretofore been an inherent and radical defect in the construction of electric field-coils. Inside of my improved field-coil rotates a drum-armature. The armature center or body is, however, composed of some non-magnetic non-conducting material, the same being so built up as to act as a non-conductor, thereby to prevent heating of the armature by the suppression or non-generation of induced currents. Upon this armature are wound parallel to its axis of rotation conducting bars or wires, the ends of which are so connected to the commutator-segments as to form a continuous circuit round the armature and constituting a closed-coil winding.

The armature just described receives its rotation by means of an electric current generated, as usual, from some external source, the current being conducted therefrom to and through the split field-coils, and also through the conductors of the armature, thence to and through the brushes which press on two such corresponding segments of the commutator as to make the current in the two halves of the armature divided, thereby causing the current at any instant in one half of the armature to be attracted by one half of the field-coils and to be repelled by the other half, the result being a rotation of the armature due to the attraction and repulsion of parallel and opposite currents, notwithstanding the current is alternating, each change in the field being accompanied by a corresponding change in the two halves of the armature, thereby making the direction of rotation independent of the direction of the external circuit. It will now be seen that as there is no magnetic matter or material in the armature, no matter what change of current or load takes place, the points of equal potential in the two halves of the armature-winding will remain in the same position—viz., in a line drawn perpendicularly to a line passing through the two points of contact of the brushes with the commutator. The armature and field-coil are mounted on a base of suitable material, as metal, wood, &c., the base having the form of a hollow rectangular ring. The base is cut through at a certain point to prevent induced currents, the field-core and base together forming a split ring having a rectangular form, all as will be more fully hereinafter set forth and claimed.

Figure 10:
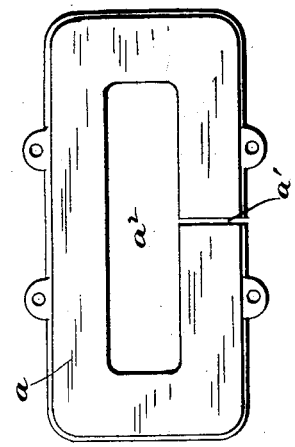

In the accompanying two sheets of drawings, illustrating my invention, Figure 1 is a side elevation of the motor, adapted more especially to be used as an alternating-current motor, a part of the winding of the field-coil being omitted. Fig. 2 is a vertical longitudinal sectional view taken through the center. Fig. 3 is a side elevation of the stationary or field coil detached. Fig. 4 is an end view of the coil, the base being represented sectionally. Fig. 5 is a cross-sectional view of the armature, taken on line $x\ x$ of Fig. 2. Fig. 6 is an end view of the armature. Fig. 7 is an end view thereof, showing the manner of connecting the wires of the armature with the commutator. Fig. 8 is an enlarged end view of an ordinary form of commutator. Fig. 9, Sheet 2, is a plan view of the motor mounted and connected as in use; and Fig. 10 is a reduced plan view of the base.

A more detailed description of my present invention, including the manner of its operation, is as follows: $a$ indicates the base, the same being made, preferably, of some non-conducting material, as wood, although metal may be employed. The form of the base is substantially rectangular, its center portion $a^2$ being cut away. One of the sides of the base is severed about midway of its length, as at $a'$, for the purpose of preventing induction. (See Figs. 1, 9, and 10.) To the top of the base are secured the two binding-posts $f$, the same being insulated, as usual, and adapted to receive the main conducting-wires $w\ w'$, which serve to conduct the electric current to the armature. The electricity is generated at some external source by a system adapted to produce an alternating current, although my motor is well adapted to utilize any form of electric current as usually produced.

B indicates my improved field-coil, the same being a substitute for the usual magnetic field. The said field-core consists of a skeleton frame or core $c$, of brass or other suitable material, the same being severed through one of its sides, as at $i$, to prevent induction, substantially as just stated with reference to the base $a$, said cut coinciding with the cut $a'$ of the base. The coil is secured to the motor-base by means of bolts $e'$, passing through an extension of the lower portion of the core, as shown in Fig. 4.

The coil B is made in halves, in order to facilitate the insertion therein of the armature and its shaft, the halves being secured together by bolts $e$. The winding of the coil is effected by passing the insulated conducting-wire $w^2$ continuously round about the core between the flanges longitudinally of its axis, (see Fig. 3, &c.,) the action of the current in passing through the coil being the same as though the core were made in one piece. The wire $w^2$ as it passes from the lower to the upper half of the coil may be coupled together so as to be readily disconnected whenever the coil is to be taken apart. The wires collectively are indicated by $d$, the terminals of the wire $w^2$ being one at a binding-post $f$, connected with the main conducting or line wire $w$, and the other being in contact with one of the brushes $m^2$ of a commutator C of usual construction.

I would state here that the coils of the field-core may be so wound and connected up in relation to the armature as to produce series, shunt, or compound winding.

The end portions of the field-coil's core are bent at $c^4$, so as to permit the shaft to revolve freely without touching, as clearly shown in Fig. 4.

A designates the armature as a whole, the same being secured to a shaft $s$, mounted to freely revolve in bearings $t$, secured to the upper surface of the base $a$. A pulley $p$ is fixed at one end of the shaft, from which, by means of a belt $m$, (shown by broken lines,) the power of the motor is transmitted to any machine, as usual, and converted into useful work. The center portion $b$ or core of said armature is made of hard wood or other suitable non-conducting material, and is provided on its periphery with a series of longitudinally-arranged raised ribs $b'$, thereby forming a corresponding number of grooves or recesses. An end piece or notched plate $h$, of brass or other material, is secured by screws $t^2$ to each end of the core $b$, and is also secured to the main shaft $s$. The said grooves lying intermediate of the ribs $b'$ are filled with insulated wire $u$, the same extending longitudinally of the machine or parallel with the winding of the field-coil, and also extending across the ends, substantially as shown in Fig. 6, and constituting a closed-coil winding. The ends of the wires pass from the end of the armature through the opening $c^4$ of the field-coil along the shaft $s$ and engage the respective segments of the commutator as common, the latter being mounted on the corresponding end of the shaft.

By reason of my improved construction in respect to the closed-coil winding the following advantages are obtained: first, that all the coils around the armature are constantly and at the same instant giving to the shaft a rotative effect; second, by reason, also, of the reduction of sparks at the commutator, the durability of the armature is correspondingly increased, whereas in the "open-coil" method of winding the only coils which give rotative effect to the armature are those whose respective commutator-segments are in immediate contact with the brushes.

I would state that practically in large armatures the number of grooves for receiving the wires $u$, as well as the number of commutator-segments, would be greatly increased, thereby lessening the liability of emitting sparks.

In Fig. 7 the arrows indicate the direction of the electric current flowing through the several coils $u$.

I would state that the form of the field-coil and base is preferably that of a hollow rectangle or annular. The core of said coil and also the base are, as before described, formed of non-magnetic materials, although at the same time they may be conductors of electricity. In the latter case the sides of the core and base are severed transversely, the cuts coinciding, as shown in Fig. 1, the reason for making the cuts $i$ and $a'$ coincide with each other being to avoid the increased cost of insulating materials, which otherwise would be necessary to be interposed between the adjacent surfaces of the coil and base.

The following describes the general operation of my improved electric motor: The electric current is received through the two main conductors $w'$ $w$. (See Fig. 9.) The current, say, from the pole $w$ passes throughout the coils of the field B, and finally enters the commutator through the medium of a brush $m^2$. From the fact that the core is cut, as at $i$, as also the base $a$ at $a'$, the entire force or energy of the current passes through the field-coil without serious loss by induced currents. In like manner the armature A is, by reason of the use of a non-metallic or non-conducting core $b$, enabled to utilize the electric current from the generator in a greater degree than heretofore has been considered possible. The rotation of the armature is due to the well-known principle of attraction and repulsion of electric currents parallel to each other and passing in opposite directions, resulting, as before stated, in producing a motor in which a greater efficiency of the current is utilized than heretofore, because of the non-generation of induced currents and of the freedom from sparks at the commutator.

By a slight change in the arrangement of the parts the machine is equally well adapted to be employed as a dynamo—as, for example, by a current of electricity from some external source being caused to flow through the field-coil while the armature is rapidly rotated by means of some independent driving mechanism, a current will be induced in the armature, which may be taken off at the commutator in the usual manner.

I do not broadly claim an electric motor having a non-magnetic core wound with insulated conductors, nor a closed-coil winding utilizing an alternating current and having magnetic matter or otherwise; but What I do claim, and desire to secure by Letters Patent, is—

1. An electric motor having the cores of the armature and field-coil composed of non-magnetic material, and having the winding of the drum-armature arranged to form a closed coil, and, further, having the conductors arranged to receive at the same instant an alternating current of electricity produced from some external source, substantially as hereinbefore described.

2. The alternating-current motor hereinbefore described, consisting of a mounted drum-armature having a non-magnetic core whose windings are connected to the segments of the collector to form a closed coil, a stationary field-coil having a non-magnetic split or severed core wound with an insulated conductor, within which coil the said closed-coil drum-armature revolves, a non-magnetic split base on which the armature and field-coil are mounted, and a commutator to give to the currents in the armature a proper direction in relation to the lines of force, substantially as set forth.

3. The combination, in an electric motor, with the electrically-connected stationary field-coil provided with a non-magnetic transversely-cut core, of a mounted armature having a non-magnetic core, a commutator electrically connected with said armature, and a non-magnetic transversely-cut base having said field-coil, armature, and commutator mounted therein, substantially as hereinbefore set forth.

4. The combination, in an electric motor, of a non-magnetic closed-coil-wound drum-armature mounted on a non-magnetic split base and revolving in a non-magnetic field-magnet core wound with a coil supplied with an alternating current, substantially as hereinbefore set forth.

In testimony whereof I have affixed my signature in presence of two witnesses.

LAWRENCE T. SMITH.

Witnesses:
CHARLES HANNIGAN,
GEO. H. REMINGTON.